July 17, 1951 — E. O. PAINTER — 2,561,287
INRUSH ELECTRIC CURRENT CONTROL CIRCUIT RECLOSER
Filed June 19, 1947 — 5 Sheets-Sheet 1
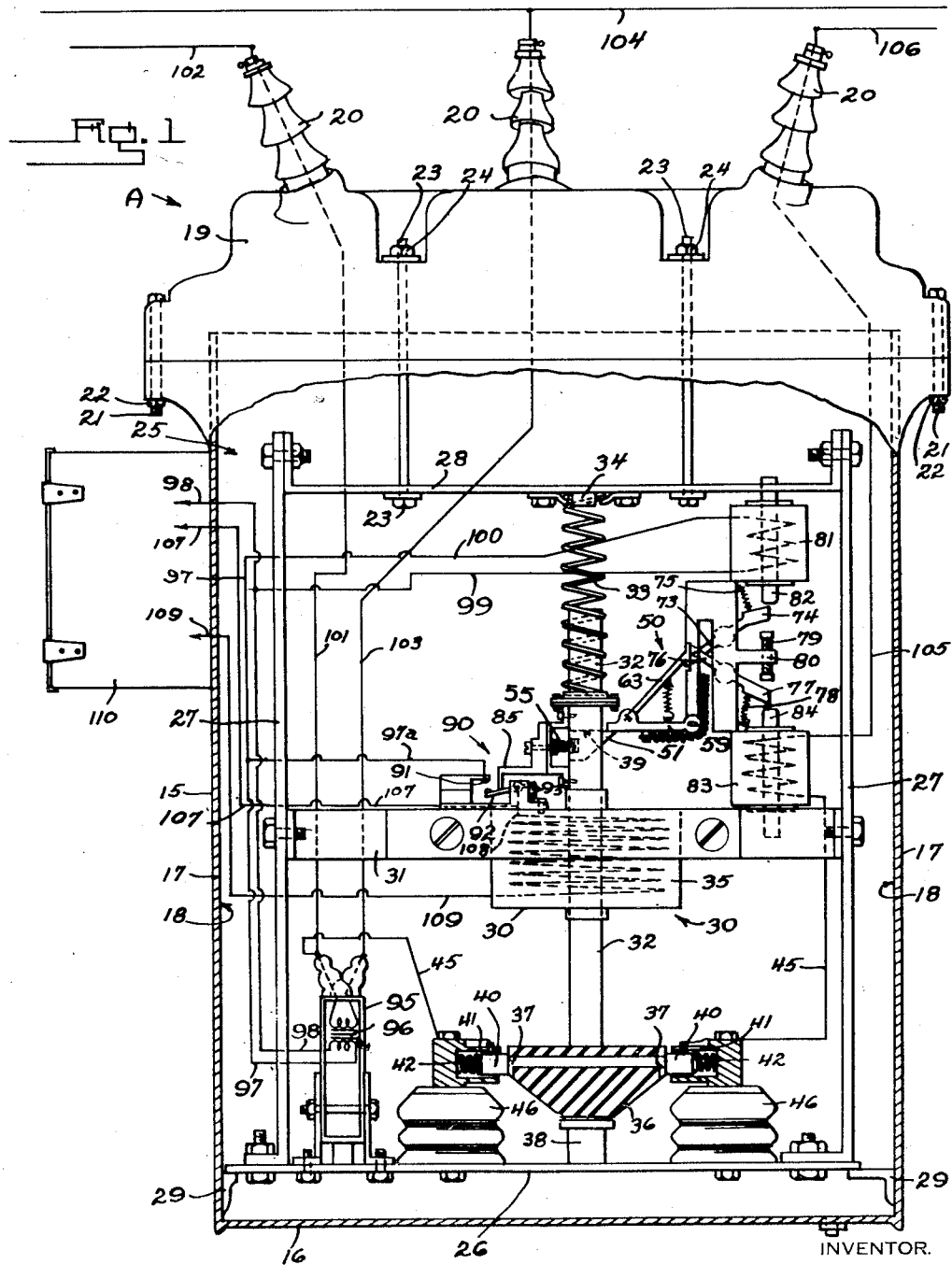
INVENTOR.
Ernest O. Painter
BY Lancaster, Allwine & Rommel
ATTORNEYS.

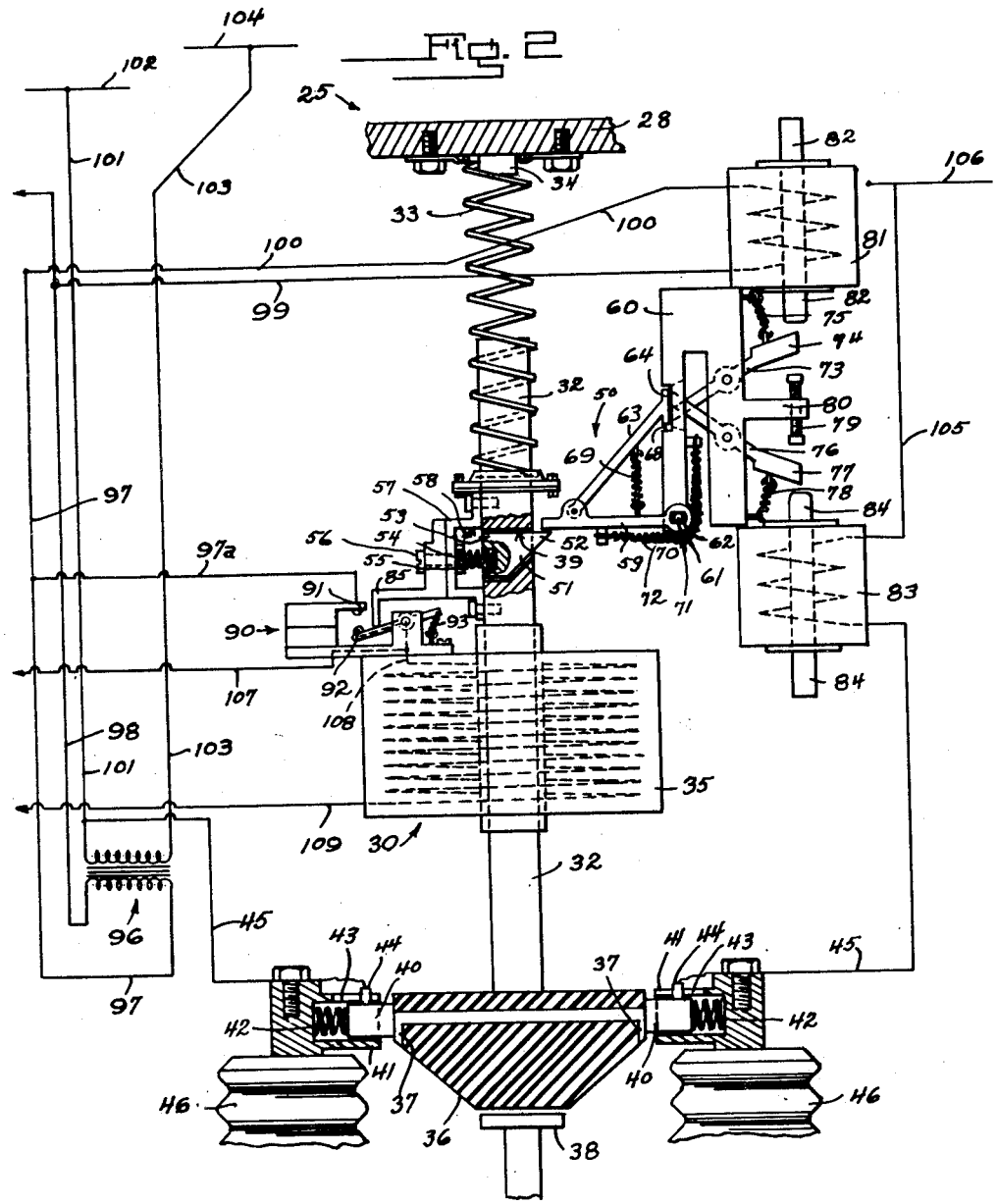

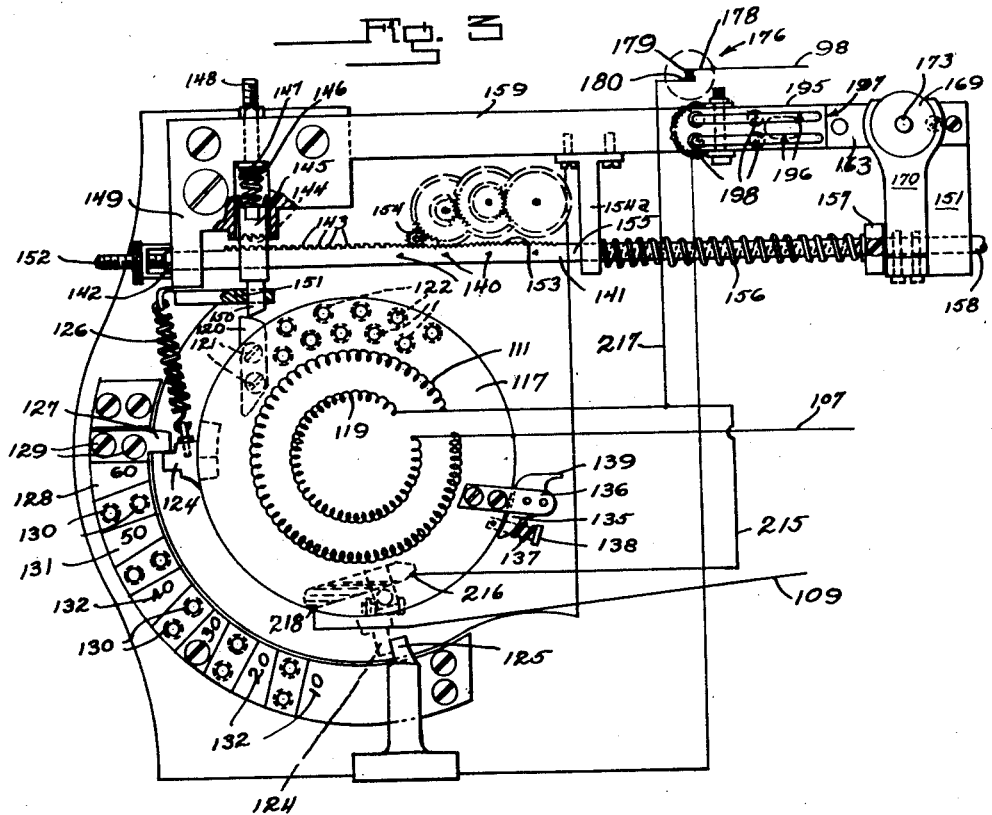
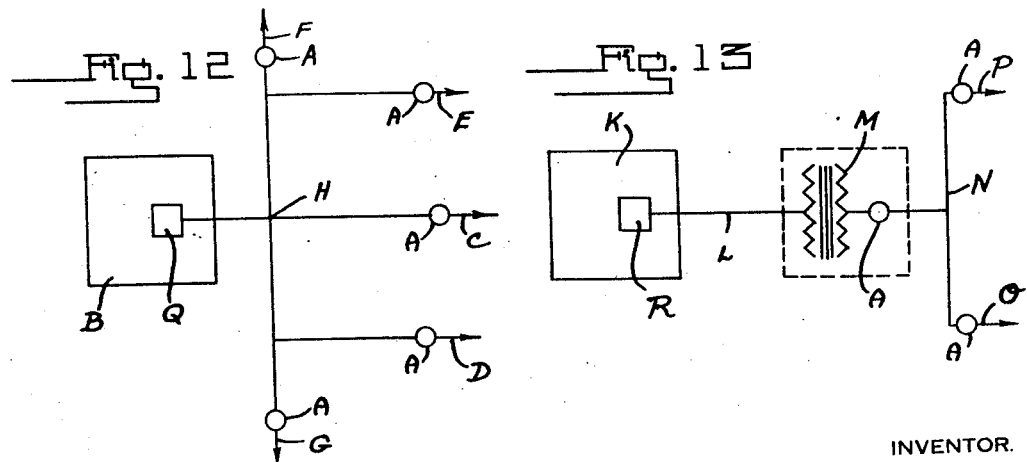

July 17, 1951  E. O. PAINTER  2,561,287

INRUSH ELECTRIC CURRENT CONTROL CIRCUIT RECLOSER

Filed June 19, 1947  5 Sheets-Sheet 4

INVENTOR.
Ernest O. Painter
BY Lancaster, Allwine, Rommel
ATTORNEYS.

July 17, 1951  E. O. PAINTER  2,561,287
INRUSH ELECTRIC CURRENT CONTROL CIRCUIT RECLOSER
Filed June 19, 1947  5 Sheets-Sheet 5
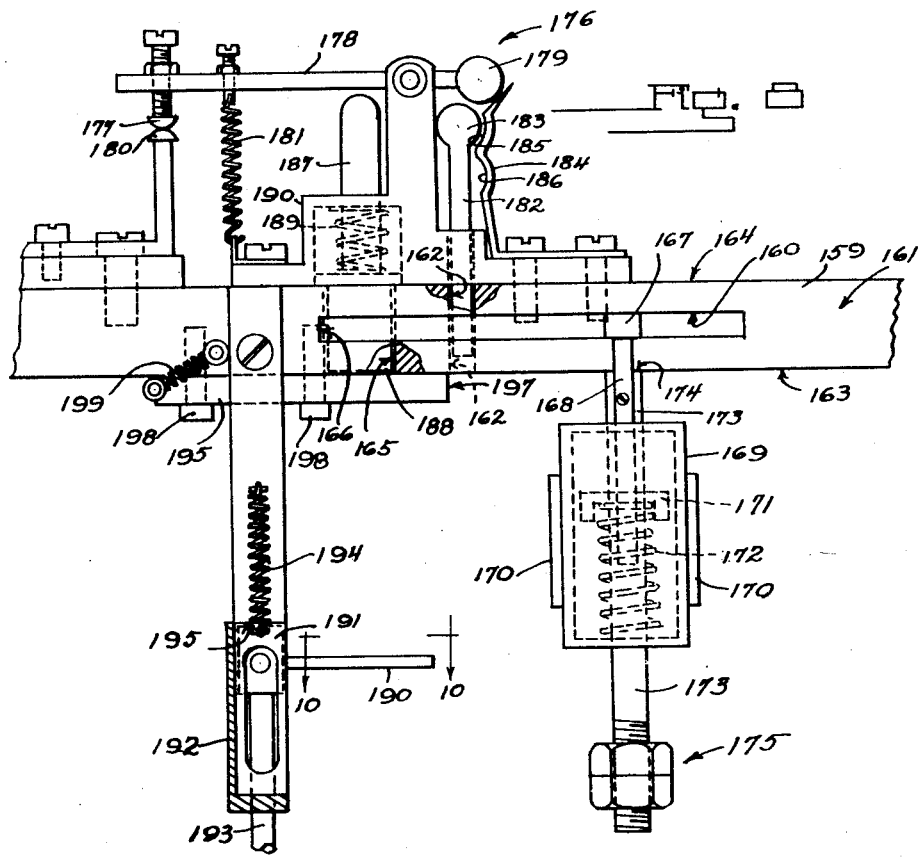
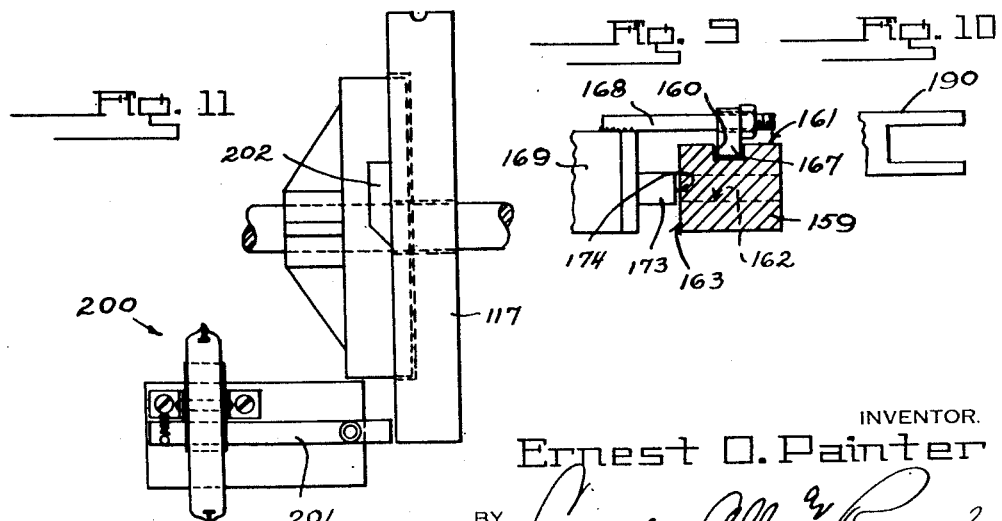
INVENTOR.
Ernest O. Painter
BY Lancaster, Allwine & Rommel
ATTORNEYS.

Patented July 17, 1951

2,561,287

UNITED STATES PATENT OFFICE 2,561,287

INRUSH ELECTRIC CURRENT CONTROL CIRCUIT RECLOSER

Ernest O. Painter, Freedom, Pa.

Application June 19, 1947, Serial No. 755,559

12 Claims. (Cl. 175—294)

This invention relates to inrush electric current control circuit reclosers. Such reclosers may be employed, for example, as means of controlling the high inrush electric current which immediately follows the closing of conventional transmission and distribution electric circuit breakers after unavoidable de-energized periods, or so-called outages. Such circuit breakers may be those associated with the transmission and distribution circuits operated by electric public utility companies serving a large number of consumers from suitable distribution areas.

High voltage transmission circuits supplying lateral or urban distribution substation areas at considerable distances from a centralized control point, further increases the inrush current magnitude, since the charging current of the transmission line and transient currents, caused by the initial excitation of distant substation transformers, add to the dynamic current when the circuit breakers are closed following outages.

This high inrush current is particularly marked in cases where a concentrated load supplied by a long transmission line, from a centralized control point, is de-energized at the source, leaving all connected load in so-called on, or working position.

When the circuit is again energized at the source, high inrush current will result, first, because of the transmission charging current; second, because of the transient and excitation current of the distant substation transformers; third, because of the dynamic load still connected to the distribution circuit supplied from the distant substation; fourth, because of the starting current of motorized equipment is at 500% above the normal running current; fifth, because of the accumulated load resulting from the loss of diversity of the automatic motorized load connected to the distribution circuit if the outage is prolonged beyond the operating time cycle of the motorized equipment.

It is obvious, from the above, that circuit protective equipment at the centralized control point or source, must necessarily be of a high rating if the circuit breaker is to remain closed when service resumption is attempted after an extended outage.

This necessity reduces the protective effectiveness of the circuit under normal conditions, because a high setting must be instituted in order to sustain the high inrush current crest which immediately follows the closing of the circuit breaker after an extended outage.

The high inrush current involved when conventional distribution circuit breakers are closed, following an outage, is caused by the loss of diversity of the automatic motorized equipment, which may include household refrigerators, water pumps, furnace blowers, sump pumps, stoker motors, air conditioners, deep freezers, and fans, and a cautionary aspect of this situation is the trend toward improved efficiencies which would shorten the operating time cycle of automatic motorized equipment, thus further aggravating the condition, because of the greater loss in diversity following extended outages.

The following arithmetical summary will serve to illustrate the inrush current magnitude over the prior outage current following an extended outage to automatic motorized load when the circuit breakers are closed. It has been established that 10 amperes of automatic appliance load, motors normally running one third of the time (off two thirds), will in a large group, contribute to a diversity factor of three. With a starting current of each at 500%, the inrush current per 10 amperes of diversified motor load will be $10 \times 3 \times 5$ or 150 amperes and this is 15 times normal; following extended outages if the running time is one-fourth, the inrush becomes 20 times normal. After an extended outage, the devices will prolong their first operating cycle to "catch up," and there are indications that the current magnitude will still be 15% or thereabouts above normal, 15 minutes after resumption of current. From the above, it is apparent that the crest value of a distribution circuit normally carrying 300 amperes can reach several thousand amperes at service resumption.

The inability to keep conventional circuit breakers closed when attempting to resume service after extended outages, has resulted in many hundreds of additional outage hours, and service could not be resumed until the circuits were manually sectionalized.

Increasing present protective relay current settings, and instituting longer time curve characteristics generally is deemed undesirable, since high values of short circuit current might persist with disasterous results far in excess of standard fault clearing time practices. Furthermore, increasing the time-current curve characteristic might place the short circuit current of distant points below the circuit breaker trip setting, thus leaving these sections unprotected.

The circuit recloser which I have invented possesses all of the desirable conventional characteristics of the standard circuit breaker. In addition, it provides a means of selective time delayed intervals before the recloser can energize the line beyond its location after potential is applied to the recloser.

Another important object is to provide a positive means of automatically controlling high inrush currents following long outages or de-energized periods characteristic of distribution circuits when the conventional circuit breaker is reclosed.

The novel recloser affords a means which will allow the lowering of current tripping values of present day conventional protective equipment at central substations, to safer limits, thus instituting greater protective margins, better operating performance of the circuits, greater protection of equipment, and increased safety of public and operating personnel.

This new recloser provides a means of eliminating manually operated sectionalizing switches which are in common use at present, thus instituting greater continuity of service, saving many thousands of circuit-outage hours.

Another important object is to provide a recloser which will afford means of isolating local faults to the particular section involved under its control, thus leaving the fault-clear portion of the circuit unaffected and normally operating, because of the recloser's ability to operate and lockout persistent faults on the line section beyond its location.

Still another major object is to provide a recloser which embodies a novel automatic mechanical means of allowing the recloser to operate only once in cases where the recloser is manually reset erroneously, and fault current beyond the recloser still persists.

This new recloser provides a plurality of selective time interval settings readily made, and related to the desired time interval setting of other reclosers installed in the same circuit.

A still further important object is to provide a recloser having an electrical control circuit arranged in such a manner that, when the device is normally operating in the closed position, the power consumption of the device is almost negligible since only one of two tripping solenoids employed is energized from a potential transformer.

Another important object of the invention is to split a normal distribution circuit into several sections, each under the control of a separate circuit recloser having a different reclosing time setting with relation to other circuit reclosers connected in the same circuit in the manner briefly described above, and affords means of controlling high inrush current at service resumption following outages by allowing the high inrush current crest in one section to decay before subsequent sections are automatically connected.

A further object is to provide a recloser which automatically trips out, de-energizing the circuit beyond itself in case of potential failure, and will automatically restore service beyond its location, after a predetermined time, when potential is reestablished.

Other objects and advantages of the invention will be apparent during the course of the following detailed description of the invention, taken in connection with the accompanying drawings, forming a portion of this disclosure, and in which drawings:

Fig. 1 is a vertical sectional view of a housing with portions of the novel recloser mechanism therein, and certain electric wiring shown diagrammatically.

Fig. 2 is a partly diagrammatic view of the portions of the new recloser within the housing of Fig. 1.

Fig. 3 is a partly diagrammatic view of the portions of the novel recloser mechanism preferably disposed exteriorly of the housing of Fig. 1.

Fig. 8 is an enlarged top plan of a lockout switch operating means of the structure of Figs. 3 and 4.

Fig. 9 is a fragmentary top plan view of a portion of the showing in Fig. 8.

Fig. 10 is a section substantially on the line 10—10 of Fig. 8.

Fig. 11 is a plan view of a mercury switch and associated structure, the switch being also shown in Fig. 4.

Figs. 12 and 13 are diagrammatic views showing two separate installations of the novel reclosers.

Figure 4:
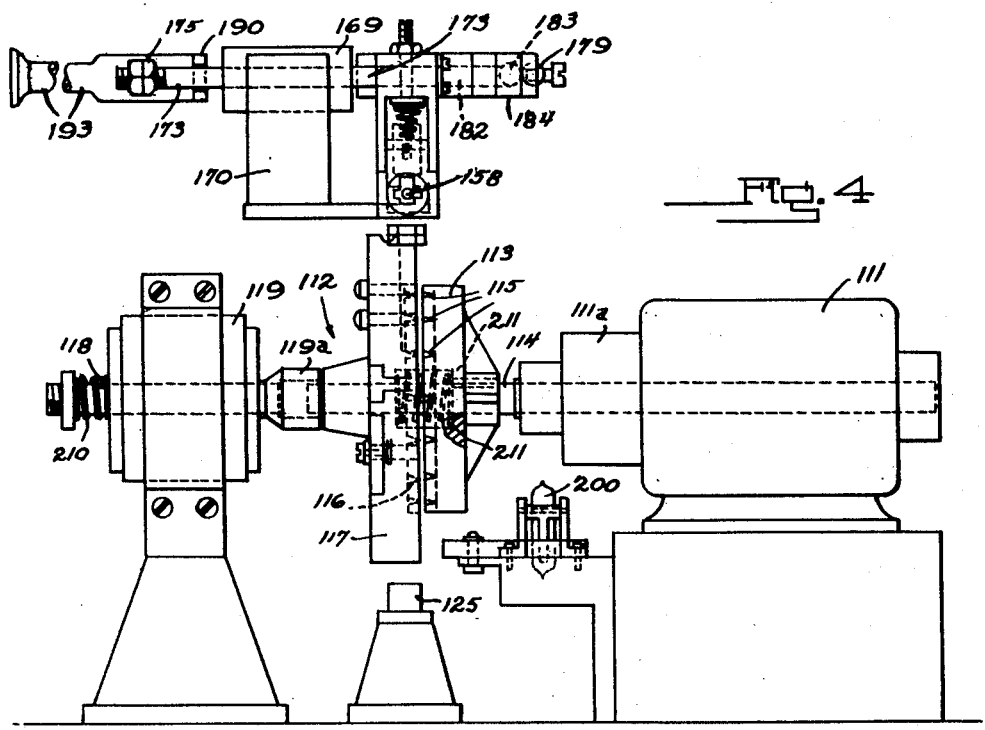
Fig. 4 is a view of most of the portions shown in Fig. 3 as viewed in a direction normal to the direction in which the portions are viewed in Fig. 3.

In the drawings, wherein for the purpose of illustration is shown a preferred embodiment of the invention, and wherein similar reference characters designate corresponding parts throughout the several views, the novel inrush electric current control circuit recloser is designated generally as A, a distribution substation as B, line sections as C to G inclusive, a distribution circuit as H, a second distribution substation, as K, a transmission circuit generally as L, a substation transformer as M a distribution circuit generally as N, and line sections as O and P. Two conventional circuit breakers are designated as Q and R.

Referring to Fig. 1, the novel inrush electric current control circuit recloser A is shown mounted in and on a suitable housing 15 having a bottom wall 16 and walls 17 extending upwardly therefrom, defining an upwardly-opening chamber 18, provided with a closure 19 which may carry insulators 20 and be detachably secured to the housing 15 by any suitable means, as bolts 21 and nuts 22.

Preferably supported within the chamber 18, by means of such as the bolts 23 extending downwardly from the closure 19, and provided with associated nuts 24, is a support or frame 25 which may include a bottom horizontally-disposed, support member 26, upstanding members 27 secured thereto, and an upper, horizontally-disposed, support member 28. The bottom support member 26 may rest upon suitable brackets 29 carried by the walls 17, disposed preferably adjacent the bottom wall 16.

Referring now mainly to Figs. 1 and 2, within the housing 15 and supported by the support or frame 25 is a main pole rod operating solenoid 30, which may be supported, intermediate the top and bottom of the frame 25, as by a suitable cross support 31 carried by the arms 27 for vertical reciprocation of a pole rod 32 which is normally urged upwardly, as by a contraction coil spring 33, against a pole rod stop 34 (which may be carried by and depending from the support member 28) since the lower end of the spring 33 is suitably secured to the rod 32 above the solenoid windings housing 35 and its upper end is suitably secured to the support member 28 at the stop 34.

The lower end of the pole rod 32 carries a head 36, preferably of dielectric material, mounting a pair of first high-tension contacts 37, which head is adapted to abut a stop 38, carried by the bottom support member 26.

Preferably, above the solenoid windings housing 35 and below the lower end of the spring 33, is a latch head-receiving slot 39 in the pole rod 32, which slot extends laterally through the rod, with the slot having one large mouth or end and an opposite smaller mouth or end (since preferably, the lower wall of the slot converges from the larger mouth toward the upper wall thereof in the direction of the smaller mouth or end). The walls of the slot 39 together with a spring-urged latch-head 51 form a pole rod latching means, the operation of which is to be subsequently described in detail.

Associated with the first high tension contacts 37, to form an electric switch is a pair of second high-tension contacts 40. Each of these may be in the form of a horizontally-reciprocating plunger, with the plungers facing one another and extending toward each other from the open ends of suitable housings 41 each of which also houses an expansion coil spring 42 normally urging the plungers outwardly. Suitable means may be provided to limit outward movement of the plungers, such as the walls of horizontal slots 43 in the housings 41 and projections 44 carried by the plungers and extending into the slots. These projections may, if desired, also carry one end of a pair of high tension conductors 45 which will be referred to subsequently. The housings 41 may be mounted upon suitable insulators 46 carried by the support member 26.

The pole rod latching means 50 includes a latch head 51 carried by the pole rod 32 and retained mostly within the slot 39 for reciprocation transversely of the pole rod 32. Normally, the down-pointed end portion 52 of the head 51 extends outwardly of the smaller end of the slot 39 while, at that time, the opposite end portion 53 of the head 51 is disposed within the slot and inwardly of the plane of the periphery of the rod 32. The end portion 53 is provided with a socket 54 to receive one end of an expansion coil spring 55, the other end of which is retained about a projection at the free end of a set screw 56 having a collar spaced from the free end upon which the spring abuts. The set screw 56 extends through a screw-threaded opening in a support 57 secured to the periphery of the pole rod 32; this support 57 having an opening or recess 58 to receive the end portion 53 of the head 51 when the end portion 52 of the head 51 does not project from the smaller end or mouth of the slot 39.

Associated with this end portion 52 of the head 51 is a latch arm 59 which normally may extend horizontally with its free outer end interposed in the vertical path of travel of the head 51, when the latter's end portion 52 projects outwardly of the slot 39. The latch arm 59 is both pivotally as well as reciprocably supported by a housing or support 60 carrying a pin or projection 61 extending through a slot 62 in the latch arm 59 at adjacent its end opposite its outer free end. Adjacent this outer free end, there is pivotally connected with the latch arm 59, a second arm 63 having a head 64 at its free end. This head 64 has a front face, upper face and lower face which latter two are preferably normal to the other face. The head 64 is normally accommodated in a recess 68 having upper and lower surfaces constructed and arranged to abut the upper and lower faces respectively but, since the recess 68 is longer than the length of the head 64 from the upper to the lower faces of the former, only one of the surfaces of the recess abuts its adjacent face of the head at one time, as may be seen in Fig. 2. The second arm 63 is also connected to the latch arm 59 by a contraction coil spring 69 with one end suitably secured to the arm 63 adjacent the head 64 and the other end suitably secured to the arm 59 intermediate its slot-containing end. A second coil spring 70 is secured at one end, to the arm 59 intermediate the ends of the latter, then projects somewhat downwardly, then extends around an arcuate face 71 of the housing 60 and, from there, upwardly where its other end is secured to the housing 60.

Referring now to portions associated with the head 64, there is a first latch-tripping arm 73, pivoted intermediate its ends to the housing 60 with its lower end normally in contact with the vertical surface of the head 64, its main body portion inclined upwardly therefrom and its upper enlarged end 74 attached to the lower end of an upwardly-extending contraction coil spring 75. The upper end of the latter may be carried by the housing 60. The enlarged end 74 provides a portion to be struck by a descending armature of a first latch-tripping arm solenoid to be subsequently described.

In addition to the arm 73, there is a second latch-tripping arm 76, also pivoted intermediate its ends to the housing 60 with its upper end normally in contact with the vertical surface of the head 64, its main body portion inclined downwardly and terminating in an enlarged end 77 providing a striking surface for an ascending armature of a second latch-tripping arm solenoid, to be subsequently described. A downwardly-extending contraction coil spring 78, secured at one end to the arm 76 and secured at its other end to the housing 60, tends to draw the end 77 of the arm 76 downwardly. An adjustable means to limit movement of the end 74 of the arm 73 downwardly and of the end 77 of the arm 76 upwardly may be provided and be a vertically-extending double-headed screw 79 carried by a horizontally-extending projection 80 of the housing 60 having a screw-threaded opening therefor, and with the heads of the screw interposed in the paths of travel of the ends 74 and 77.

As to the first latch-tripping arm solenoid mentioned (the solenoid constructed and arranged to operate the first latch-tripping arm 73), this solenoid 81 is designated as the no-voltage tripping solenoid and is positioned with its vertically-reciprocating armature 82 disposed to strike upper surface of the end 74 of the first latch-tripping arm 73, and the windings housing thereof may be supported by the frame 25.

The second latch-tripping arm solenoid 83, which may be termed the high-tension, short circuit-tripping solenoid, also has a vertically reciprocating armature 84 constructed and arranged to strike the under surface of the end 77 of the arm 76. The housing of this solenoid is suitably supported by the frame 25.

Attention is now directed to the electric switch structure, associated with the support 57, to the left of the pole rod 32 in Fig. 2 and above the housing of solenoid 30. This support has a substantially horizontally-depending arm 85 constructed and arranged, upon downward travel of the pole rod 32 to open a normally closed switch 90. This switch has a fixed contact 91 and a movable contact 92, the latter being a pivoted arm, interposed, intermediate its ends, in the path of travel of the arm 85. The contact 92 is normally urged into engagement with the contact 91 by a retraction coil spring 93, but is opened upon descent of the arm 85. Switch 90 may be mounted upon the upper face of the housing for the windings of solenoid 30.

Disposed, in the example shown in the lower left-hand portion of the chamber 18, as in Fig. 1, is a transformer housing 95 enclosing a potential transformer 96. From an end of one windings thereof a lead 97 extends, by way of a branch 97ª, to the fixed contact 91, while the other end of this windings is electrically connected, as by lead 98, to a lead 99 extending to the lower end of the windings of the solenoid 81 and the other end of the solenoid windings is electrically connected, as by lead 100, to the lead 97. As for the other windings of the transformer 96, one end thereof is electrically connected, as by lead 101, to the main line conductor 102 and the other end, by lead 103 to the conductor 104. The lead 101 and conductor 102 are electrically connected, as by one of the conductors 45 to one of the high-tension contacts 40.

From the other high-tension contact 40, the second conductor 45 extends to the lower end of the windings of solenoid 83 and, from the upper end of these windings, a lead 105 extends to the main load conductor 106.

From the movable contact 92 a lead 107 extends to one end of the windings of an electric motor 111 and to the windings of a solenoid 119 to be subsequently described. Electrically connected with the lead 107 is a lead 108 to the upper end of the windings of the solenoid 30 while the other end of the windings of this solenoid is electrically connected with a lead 109 extending to one terminal of a mercury switch to be later described.

Referring now mainly to Figs. 3 to 9 inclusive this structure is disposed preferably exteriorly of the housing 15, but may be enclosed by a suitable device, such as the cabinet 110, shown in Fig. 1, carried by the walls 17 of the housing 15. This structure includes a suitable synchronous electric motor 111, a conventional speed reduction gearing 111ª operatively coupled thereto, and a clutch-like structure designated generally at 112.

Figures 5, 6, 7:
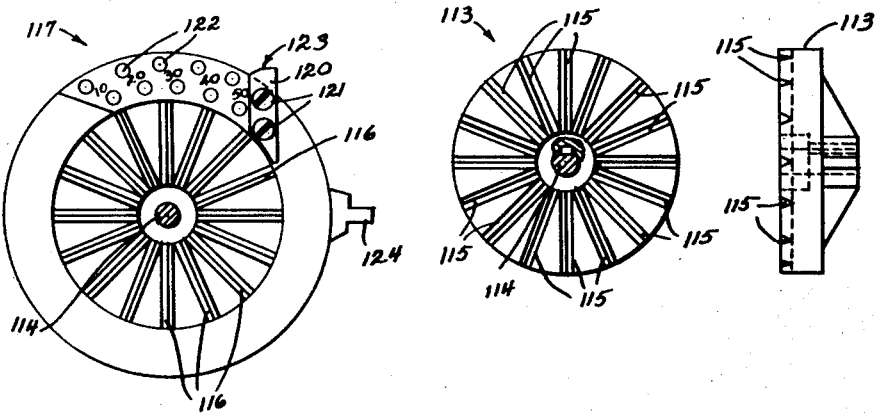
Fig. 5 is a plan view of a time delay disc associated with the structure of Figs. 3 and 4.
Fig. 6 is a plan view of a motor-driven disc associated with the disc of Fig. 5.
Fig. 7 is an edge view of the disc of Fig. 6.

The clutch-like structure 112 includes a disc 113 shown in Fig. 6, rotatably carried by the motor shaft 114 having radially-extending grooves 115 extending from one face thereof constructed and arranged to mesh with radially-extending teeth 116 in one face of a time delay disc 117 shown in Fig. 5, which disc is mounted for reciprocation, along its axis of rotation, upon the shaft 114 and urged into meshing engagement with the disc 113 by a horizontally-disposed armature 118 of a solenoid 119, having a head 119ª.

The disc 117 of Fig. 5, carries an adjustable rack-free timing catch member or projection 120, extending non-radially outwardly of the plane of the periphery of the disc. This projection 120 may be detachably secured to the disc 117 as by pairs of screws 121 carried by the projection and extending through pairs of screw threaded sockets 122 projecting inwardly from one of the disc's faces. Preferably, these pairs of sockets are designated by suitable indicia as "10," "20," "30," etc., shown in Fig. 5. These and the other numerals represent seconds of time, so that a setting to meet the requirements of a particular recloser may be had.

It should be noted that the outermost face 123 of the projection 120 is arcuate, for a purpose later detailed.

Carried at the periphery of the disc 117 and projecting preferably non-radially therefrom, is a timing disc stop arm or member 124. This arm 124 is adapted to contact a stationary stop 125 interposed in the path of the former, as may be seen in dotted lines in Fig. 3. A contraction coil spring, which may be termed the timing disc return spring 126, has one end secured to the stop arm 124 and normally extends upwardly to a rack locking and lifting pin support structure which will be subsequently described.

The timing disc stop arm 124, during its movement with the disc 117 is also adapted to contact a second, but adjustable, stop 127 carried by a suitable support 128 by means of suitable screws 129 the shanks of which may extend into any selected group of screw threaded sockets 130 in the support 128. In the example shown the support has an arcuate edge facing the periphery of the disc 117 and a face 131 normal to this edge, from which the sockets 130 extend. Guide indicia (numerals representing seconds of time), as that designated 132, may be provided on the face 131 for adjustment of the stop 127. Any selective time-setting position may be had by this adjustment, depending upon the particular reclosing time setting selected. As may be seen in Fig. 3, the disc 117 has a rotation of substantially 90° but, obviously, the rotation may be less than 90° upon adjustment of the arm 127.

Lockout means to render the recloser open and inoperative under persistent short circuit conditions includes a third member, this being an integrating pin catch 135 carried by a bracket 136 preferably detachably secured to one face of the disc 117 and projecting non-radially therefrom. This catch 135 is pivotally carried by the bracket 136, with one end portion of the catch urged into contact with the periphery of the disc by a suitable means, as the expansion coil spring 137 with its inner end bearing against the outer face of the catch 135 and its inner end bearing against the head of an adjustable screw 138, the outer end of the shank of which screw is surrounded by the spring. The shank then extends through a hole in the catch and into a screw threaded socket in the disc 117. The catch 135 has a bill 139 at its end portion opposite the end portion resiliently retained by means mentioned for engagement (when discs 113 and 117 are in contact with each other) with one of a plurality of integrating pins or projections 140 extending, in equally spaced-apart relationship, in a row, along one face of an elongated reciprocating member, being a rack 141. This member has, inwardly of one end 142, a plurality of teeth 143 constructed and arranged for meshing with the teeth 144 of a rack lock 145 which is normally urged downwardly by an expansion coil spring 146 bearing at one end, against the upper end of the lock 145 and bearing, at its upper end, against the lower, enlarged extremity 147 of an adjusting screw 148 rotatably carried by a rack locking and lifting pin support structure 149 (which structure carries one end of the spring 126 heretofore described). The lock 145 is reciprocable vertically so that its teeth 144 will or will not mesh with the teeth 143 of the rack 141 depending upon the position of the former. This reciprocation is effected by contact of the rack-free timing catch member or projection 120 with the beveled lower end of a projection 150 extending downwardly from the lower end of the rack lock body. The projection 150 extends through a suitable opening in a guide arm and abutment 151 carried by a portion of the structure 149. In order to effect tolerance adjustment of the rack 141 with reference to the pins 140 and catch 135, a suitable tolerance adjustment means may be provided, such as an adjusting nut carrying a shank 152 adapted to abut the screw threaded end 142 of the rack 141 and extending through a bracket carried by the structure 149.

The rack 141 has a plurality of pinion-meshing teeth 153 meshing with those of a pinion 154. Preferably these teeth 153 are intermediate the length of the rack and project from the same edge thereof as contains the teeth 143.

Referring now to that portion of the rack 141 to the right of the teeth 153, as in Fig. 3, the rack slides through an opening in an arm or bracket 154a depending from the structure 149 and, surrounding a portion 155 of the rack (which portion may be round in transverse cross section) is an expansion coil spring 156, which may be termed the rack return spring, with one end bearing against the bracket 154a and its other end bearing against an adjustable spring abutment 157, which is spaced inwardly of the end 158 of the rack portion 155, and will compress upon the travel rearwardly (toward the right in Fig. 3) of the rack.

Paralleling and spaced from the rack 141, as in Fig. 3, is a carrier bar or elongated member 159 which forms an arm of the structure 149. This member 159, as shown in Fig. 8 has a straight, longitudinally-extending slot 160 extending inwardly from its face 161, from adjacent to juncture of the member 159 and arm 151, a perforation 162, extending normal to the slot 160 from the face 163 to the face 164, and an oval opening 165 extending from the face 163 to the face 164. The perforation is disposed below the slot 160 and substantially midway the length of the slot, and the opening 165 is also below the slot 160 but near its end 166.

Slidable in the slot 160 is a slide shoe or enlargement 167 upon the end of an arm 168, and the section of this arm adjacent the shoe 167 is adapted to slide longitudinally of the carrier bar 159, upon the face 161 thereof. The outer end of the arm 168 is secured, in any approved way, as by welding, to the upper side face of a lockout pin cylinder 169 which is secured to a bracket 170 carried by the rack 141 beyond the abutment 157.

The cylinder 169 contains a piston 171 urged toward the carrier bar faces 163 by an expansion coil spring 172 and to the piston is secured a lockout pin 173 which slides longitudinally of the cylinder 169 and extends outwardly of both ends thereof, with the spring 172 coiled about the rearward portion of the pin 173 within the cylinder. Normally the end face 174 of the lockout pin bears against the face 163 of the carrier bar 159 and positioned to pass over the perforation 162 (since the lockout pin is larger in diameter than is the diameter of this perforation). This end of the lockout pin is adapted to enter the opening 165. The portion of the lockout pin opposite its end face 174, projecting from the cylinder may be exteriorly screw threaded to receive a pair of nuts providing an abutment 175 for a purpose later detailed.

Referring now to the lockout switch 176 shown mainly in Fig. 8, this includes a movable and adjustable contact 177 carried by an arm 178 having an enlargement 179 at its end opposite the contact 177 this being, preferably, a sphere. The arm 178 is pivoted intermediate the contact 177 and sphere 179 and normally urged into contact with the fixed contact 180 by a retraction coil spring 181. A portion of the sphere 179 is within the plane of the perforation 162.

Reciprocable in the perforation 162 is a lockout switch reclosing pin or plunger 182 having a head 183 (which may be a sphere) at its end adjacent the sphere 179. The shank of the plunger 182 is of a length so that, in one position, it is inwardly of the plane of the face 163 (as in Fig. 8) and, in another position, outwardly of that plane. When it is inwardly of that plane, the sphere 183 is closely adjacent the sphere 179 and the switch 176 will be closed. When the shank of the plunger is outwardly of the plane of the face 163, the switch 176 will be open but the two spheres closely adjacent one another. The plunger 182 may be releasably held, with the sphere 183, in these two positions by a spring clip 184 having a concave seat 185 for the spheres 179 and 183 and a concave seat 186 for the sphere 183 (when the plunger 182 extends outwardly of the plane mentioned). Thus the clip 184 retains both the switch arm 178 in an open-switch position and the plunger 182 protruding from the face 163, or, when the switch arm 178 is released (switch closed), the sphere 183 will be in the concavity 185. Obviously, the reciprocation of the plunger 182 will close the switch, as in Fig. 8.

Associated with the switch arm 178 is a lockout switch trip means, which may be a second plunger 187 with one end thereof adapted to engage the switch arm 178 to open the switch 176. Normally, the second plunger 187 is disposed as in Fig. 8, but it has a portion 188, slidable within the opening 165 and adapted to be contacted by the lockout pin 173 which may enter the opening upon travel thereof to the left as in Fig. 8. (It should be remembered that the reciprocating lockout pin is operatively connected with the rack 141.) However, when not so contacted and pushed toward the switch arm 178 by the lockout pin, the second plunger 187 is urged away from the open switch arm by an expansion coil spring 189 bearing at one end against the housing 190 through which the outer end of the plunger 187 slides, and with its other end bearing against one face of the enlargement 188.

Thus, while the plunger 182 is adapted to close the switch 176, the plunger 187 is adapted to open it, but both plungers are actuated by the lockout pin 173.

Referring now to the abutment 175 upon the lockout pin 173, this is constructed and arranged, upon travel of the lockout pin to the left in Fig. 8, to be engaged by a forked member or lifting fork 190, shown in Figs. 8 and 10, preferably manually movable toward and away from the carrier bar 159 and secured to a plunger 191 slidable within a suitable slotted housing 192 (through the slot of which the fork 190 protrudes) and with the plunger reciprocably actuated by an operator who may pull or push on a suitable handle 193 attached to the plunger 191 and extending outwardly of the housing 192 which latter may be rigidly secured to the carrier bar 159. A retraction coil spring 194 may be provided to urge the plunger 191 toward the carrier bar but with the plunger stopped by an abutment 195 carried by the housing. It will be noted that the structure 190 to 195 inclusive is disposed to the left of the opening 165 as in Fig. 8 or so that, when the lockout pin 173 has travelled to a position for its head to enter the opening 188, the end of the lockout pin carrying the abutment 175 will be straddled by the fork 190. Therefore, drawing outwardly on the handle 193 will cause the fork to engage the abutment (which, due to the forward movement of the lockout pin is then closely adjacent the fork) and draw the lockout pin out of the opening 188.

An important part of the structure of the lockout means is a lockout discriminator gate 195, shown particularly in Figs. 3 and 8. This may be a plate having a pair of longitudinally-extending slots 196 and slidable over the face 163 of the carrier bar 159. The gate has a lockout pin-contacting edge 197 and is supported by suitable headed pins 198 extending through the slots 196 and carried by the carrier bar.

Normally, the gate 195 is disposed in a position to cover the opening 188 (as in Fig. 8) with its edge 197 at but not covering the mouth of the perforation 162, and is urged to this position by a contraction coil spring 199 at which time the left-hand pins 198 (as in Fig. 8) are at the left-hand limit of the slots 196.

Referring now to the electric switch 200 shown mainly in Fig. 11, but also in Fig. 4, this may be a conventional mercury switch, with one end normally tilted to an open-circuit position, but pivoted to be rocked to a closed-circuit position by an arm 201 positioned to be moved into engagement with the lower end of the mercury housing. This arm 201 is actuated by a switch arm actuator 202 carried upon the outer face of the time delay disc 117, as in Fig. 11, and positioned so that it will be in the path of travel of the actuator 202 as the disc 117 rotates.

The pinion 154 shown in Fig. 3 and meshing with the teeth of rack 141, is operatively connected with a suitable gear train for association with a conventional brake assembly (not shown).

It will be noted in Fig. 4, that the armature 118 is urged to the left by the expansion coil spring 210 so as to permit the disc 117 to move away from disc 113, urged by the coil expansion spring 211 between them.

As for the remainder of the electric wiring (shown mainly in Fig. 3), a lead 215 extends from one end of each of the windings of the disc-meshing solenoid 119 and the motor 111 to one terminal 216 of the mercury switch 200. A lead 217 extends from the fixed contact 180 of the switch 176 to the lead 215. The lead 98 extends to and is electrically connected with the arm 178 carrying the movable contact 177 and the lead 109 connected with the terminal 218 of the mercury switch 200.

When the recloser is in the closed position as shown in Figs. 2 and 3, and the potential is disconnected at the source side 192 of the recloser, de-energizing the potential transformer 96, the no-voltage solenoid 81 will release the armature 82 which, by virtue of its mass and gravity, will strike the latch arm 59, and cause the latch lock head 64 to be forced out of its recess 68.

This last action quickly causes the arm 59 to pivot upwardly and permit the pole rod spring 33 to return the pole rod 32 so that its upper end will abut the pole rod stop 34, thus quickly opening the high tension contacts 37 and 40. Simultaneously with the above operations, the low tension switch 90 automatically closes.

The pole rod lock-in latch arm 59, now being free of the latch head 61, the former and its associated structure 63, 64, 69 and 70 will return to their original positions as they are shown in Fig. 2.

The recloser will now remain open until the potential is again established to the potential transformer 96, and, even so, high tension contacts 37 and 40 cannot again reclose the circuit until the time delay mechanism has run through the following sequence: If the potential is now applied to the potential transformer 96, by energizing the circuit to the recloser, the time delay mechanism will automatically and immediately start operations in order to reclose the high tension contact members 37 and 40, establishing service beyond the recloser after a predetermined time period. Since the potential transformer 96 is now energized, and the low tension switch 90 is in the closed position the synchronous motor 111 will start to rotate its shaft in a given direction. Simultaneously, the solenoid 119 will be energized and its armature will force the time delay disc 117 against the grooved face of the motor-driven disc 113, causing both discs to rotate as a unit. Rotation of these two discs will continue until the member or switch arm actuator 202 strikes the tilting beam of the mercury switch 200 causing the liquid mercury to complete the electrical circuit through the main pole rod operating solenoid 30, so that the pole rod 32 will move downwardly against the tension of the opening spring 33, thus closing the high tension contacts 37 and 40. Obviously, this action is timed to take place and be completed just before the timing disc stop arm 124 contacts the stationary limit stop 125 as shown in Fig. 4.

Simultaneously with the closing of the high tension switch, including the contacts 37 and 40, the latch mechanism 51, 59 and 63 will have locked the pole rod in the closed position and, at the same time switch opening arm 85 will have opened the low tension switch 90 which, in turn, will de-energize the main operating solenoid 30, synchronous motor 111, and disc meshing solenoid 119, whereupon the spring 211, Fig. 4, will return disc 117 to its original position clear of disc 113. As soon as disc 117 is clear of disc 113, as shown in Fig. 4, the timing disc return spring 126 quickly returns the timing disc 117 to the adjustable stop 127 as shown in Fig. 3, which, as stated, may be placed at any of the selective time-setting positions, depending upon the particular reclosing time setting selected.

At the time that the synchronous motor 111 and the disc-meshing solenoid 119 are simultaneously energized, and the meshing of the two discs 113 and 117 is completed, several other actions automatically take place as follows: The rack 141 moves with disc 117 away from the plane of the rack locking pin 150 allowing this pin to move vertically downwardly locking rack 141. The rack now can be moved only in the forward direction by the integrating pin catch 135 which is positioned for contact with the integrating pins 140 only at the time when the discs 113 and 117 are meshed. The only time when rack 141 can return to the rack guide arm and abutment 151 is when the rack free timing catch member 120 is in the position as shown in Fig. 3, or when the circuit recloser is normally closed.

Repeated operations of the time delay mechanism, such as would occur during high-tension short-circuit or over-load, would successively advance the integrating pins 140 until lock-out would take place. Lockout takes place after the third reclosure at which time the lockout switch 178 is opened, rendering the recloser inoperative, in the open position, until the automatic lockout pin 173 is manually reset.

The functions described above for the operations after potential is established to the recloser following an outage, are identical in sequence when the recloser is caused to trip out because of a fault current beyond the recloser originating in the load conductor 106. However, if fault current is the cause of the recloser being tripped out, armature 84 of the high tension short circuit tripping solenoid 83 strikes the head 77 of the second latch-tripping arm 76, tripping latch and initiating the recloser opening functions. If short circuit conditions persist, repetition of the initiating sequence caused by tripping the solenoid 83, will immediately reopen the recloser, following each time-delayed closing of the high tension contacts, until lockout occurs.

The lockout means to render the recloser open and inoperative under persistent short circuit conditions is accomplished in the following manner: Attached to the timing disc 117 is the integrating pin-catch 135 and rotation of the timing disc 117 advances the integrating pin-catch 135 until contact is made with an integrating pin 140. Each full operation of the timing disc 117 will advance the rack 141, one pin position forward, with each closing operation of the recloser. The rack 141 is held in this new position until rack-free catch member 120 is returned by the timing disc 117, to the normal operating position as shown in Fig. 3 and when so returned its action is to release the rack lock 145 so that rack 141 may drift back to the rack abutment and guide arm 151 at a predetermined rate of speed. This is the normal function of rack 141 and the integrating pins 140 each time the recloser operates to close the high tension contacts under normal conditions.

However, should short circuit conditions persist from the vicinity of load 106, fault current will reopen the recloser immediately. Simultaneously, with the reopening of the recloser, the low-tension switch 90 closes. This immediately energizes synchronous motor 111 as well as the disc-meshing solenoid 119, causing disc 117 to move axially toward and in contact with 113, so that rack free catch member 120, will have moved beyond the region of rack lock lifting pin 150, thus permitting the teeth of rack lock 145 to engage the teeth 143 of rack 141, thus locking the rack in this new position. The above stops the backward drift of the rack.

Persistent fault current will cause a repetition of the operations described above and each complete operation of the disc 117 will advance the rack 141 one pin space forward. Finally, integrating pin catch 135 will contact and move forward the last or fourth integrating pin 140 as though the recloser were going to be closed for a fourth time. Half way through this sequence however, and before the recloser could close a fourth time, the lockout pin 173 will have engaged and tripped lockout switch trip pin causing the lockout switch 178 to open, de-energizing the electric motor-control circuit.

Under the lockout condition, the rack 141 and its integrating pins 140 will remain in the lockout position, even though the ratchet-free catch member 120 is returned to the normal operating position, thus freeing the rack lock 145 when the control circuit is de-energized. This affords means for allowing only one more closing operation of the recloser should the recloser be manually reset erroneously and fault current still persist. This feature is accomplished by action of the lock-out discriminator gate 195.

By its association with the lock-out mechanism, the lock-out discriminator gate affords a means of allowing the recloser only one more closing operation, should the recloser be manually reset in ignorance of persistent fault current, with the further ability to automatically return rack 141 to the normal operating position at rack abutment and guide arm 151, in the event that normal conditions exist when the recloser is manually reset.

The automatic operation of the discriminator gate is performed as follows: Lock-out pin 173 which is movable with the rack 141, slides longitudinally along the carrier bar 159 upon reciprocation of the rack. Therefore, in the case of persistent fault current, causing rack 141 to be successively advanced by repeated operations of the timing disc 117, the lockout pin 173 will be advanced accordingly, and if three successive reclosing operations have been performed, the lockout pin 173 will have moved to the lockout position. At a predetermined point the lockout pin will contact the contact discriminator gate 195, forcing the gate ahead of it, and exposing the head of switch opening pin or plunger 187 to the spring pressure of the lockout pin, whereupon the spring forces the lockout pin into the lockout well or opening 165, thus opening switch. The recloser is now automatically locked out and open, and will remain so until manually reset.

To manually reset the recloser for further automatic operations, the operator has but one operation to perform. That is, to reset the recloser by pulling outwardly on the manual reset handle Fig. 8, and immediately releasing the same. Pulling outwardly on the manually reset handle 193 causes the lifting fork to pull the lockout pin 173 out of the lockout well or opening 165, whereupon the discriminator gate immediately moves over the lockout well, i. e., returns to its original position on carrier bar 159 and the lockout pin 173 now rides upon the surface of discriminator gate instead of upon carrier bar.

The previous operation of the opening switch causes the ball end of the switch bar to strike the switch closing pin, forcing the latter into the second or lower section of the spring clip 185. When the switch reclosing pin is in this position, its other end protrudes outwardly of the surface of the carrier bar.

When the rack 141 drifts rearwardly (that is, moves to the right in Fig. 3) carrying with it the lockout pin 173 to the edge of the discriminator gate, the lockout pin slips off the rear edge of the discriminator gate 195, striking the switch reclosing pin which is, as stated, protruding outwardly of the surface of the carrier bar. The spring pressure upon the lockout spring forces the switch reclosing pin to return to its original position within the spring clip 140, thus reclosing the locking switch. The action of reclosing switch at the time when the lockout pin slips off the rear edge of discriminator gate bears a relationship to its position on the rack which will allow the recloser to reclose again only once, in the event that fault current still persists. On the other hand, should line conditions be normal, the rack will drift rearwardly to the normal operating position, completely resetting the recloser for a full sequence of operations. Since the lockout pin is larger in diameter than the switch reclosing pin, the former will pass over the opening in the carrier bar when moving thereover toward the lockout well.

When the rack 141 is advanced, step by step due to the operations of the integrating pin catch 135, and the integrating pins 148, the rack return spring 156 is compressed. This resultant stored energy in the spring is the means used to return the rack to the stop 151.

Control of this stored energy stored in the rack return spring is accomplished by the application of the train gear escapement, which regulates the return speed of the rack.

The train gear is actuated by way of the teeth of pinion 154, meshing with the teeth 153 of the rack and is adapted to conventionally step up the R. P. M. at the final stage to a suitable speed for a conventional governor brake. It is preferred that the R. P. M. of the final stage of the train gear should be in the neighborhood of 300 R. P. M., in order to insure smooth and constant braking effect to the rack so as to regulate the return speed thereof to the rack stop 151 at a desired predetermined rate of speed. The governor brake will be arranged, of course, in such conventional a manner so that no braking effect takes place on the forward movement of the rack, regulating only the backward drift of the same to the stop 151.

Obviously the automatic operating function of the driven timing disc 117 is dependent solely upon the speed of the driving disc 113. For example, the speed of the driving disc is .25 R. P. M. or one complete revolution in four minutes when the motor 111 is energized. The total rotation of the driven disc for each complete operation will vary, depending upon what location the adjustable stop 127 is placed to secure a predetermined time delay interval at which the recloser is to operate.

The speed of the synchronous motor 111 may be reduced to the desired R. P. M. to produce a shaft speed of .25 R. P. M. at the driving disc 113, through the conventional speed reduction gearing 111ª. It should be pointed out that the power duty of the synchronous motor is very light, since it is confined to turning driven timing disc at a very low rate of speed, whereby a small synchronous motor would easily accomplish this task.

The only time synchronous motor 111, discmeshing solenoid 119, and high-tension contacts-operating solenoid 30 are energized, is when the control switch 90 is closed. This is closed only when the recloser is in the open position, at which time the high tension contacts 37 and 40 are not in engagement. Furthermore, the high-tension contacts-operating solenoid is not energized until the recloser has operated through the time delay setting for which it is set and has closed the tilting mercury switch completing the control circuit through the main operating solenoid 30 to close the high tension contacts mentioned.

In Figs. 12 and 13 are shown two different examples of the installation of the novel recloser. Fig. 12 illustrates a typical distribution circuit H into which five inrush current reclosers A are installed on the various main sections or laterals of the circuit. The letter B designates the distribution substation which houses the conventional standard distribution circuit breaker Q with the conventional circuit protective equipment, and the line sections beyond and under the control of the lateral line reclosers A are designated as C, D, E, F and G. Under normal conditions the distribution circuit H is energized and normally operating with all line reclosers A in the closed position.

Now assuming that the circuit is either purposely or accidentally de-energized for some unavoidable reason (or reasons), at the substation B by the opening of the main circuit breaker and the line reclosers are designed for instantaneous no-voltage tripping by the action of the tripping solenoid 81, the following will be the operating sequence of the circuit when the same is re-energized by closing the main circuit breaker at the substation B. Since the line reclosers A will be in the open position and unable to close until a predetermined time after the main circuit breaker at substation B is closed, only approximately one sixth of the circuit is immediately energized following the closing of the main circuit breaker.

If the selective time setting of the line reclosers are graduated in ten seconds-increasing time intervals, the following will be the sequence of operations after the main circuit breaker at substation B is closed until all line reclosers have successively operated to restore service to the entire circuit: (1) Zero time and circuit breaker closes at substation B, energizing the line between the main circuit breaker and all line reclosers which are in the open position; (2) ten seconds later and line recloser A associated with line C, automatically closes, energizing the line C beyond its location; (3) ten seconds later (or twenty seconds after main circuit breaker closed at substation B), and recloser A associated with line D automatically closes energizing the line D beyond its location; (4) ten seconds later (or thirty seconds after main circuit breaker closed at substation B), recloser A associated with line E automatically closes energizing the line E beyond its location; (5) ten seconds later (or forty seconds after main circuit breaker closed at substation B), recloser A associated with line F automatically closes, energizing the line F beyond its location; and (6) ten seconds later (or fifty seconds after main circuit breaker closed at substation B), recloser A associated with line G automatically closes energizing the line G beyond its location.

It should be pointed out that the successive time intervals of ten seconds between the respective reclosers A is not mandatory, but actual tests have indicated that, on the typical distribution circuit, five to ten seconds successive time intervals between the various reclosers is the minimum time required to allow the inrush current crest of one line section to dissipate to a safe margin before successive line sections are added to the circuit. Since the ultimate magnitude of the final inrush current peak at service resumption is amplified with each minute following the opening of the main circuit breaker, high inrush current is not a serious problem for the first one hundred seconds after the main circuit breaker has opened. In view of the above, some users may desire that the circuit reclosers not be designed for instantaneous tripping when the main circuit breaker is unavoidably opened.

In Fig. 13 is illustrated a typical single circuit transmission such as one supplying a rural substation and rural distribution circuit into which three line reclosers, for example, have been installed. Of course, this new recloser affords a special means of controlling both high transient currents and high inrush currents, following unavoidable outages on long single circuit transmission lines feeding from a centralized point supplying rural or isolated distribution circuits, and manual supervision and operations can be eliminated at the distribution or distant end of such circuits by the use of this recloser. In addition, before the distribution load is applied, the ability of the new recloser to re-establish service beyond itself, after a predetermined time, when potential is established up to the recloser, will afford a means of dissipating the charging current of the transmission line and also the transient caused by energizing the rural substation transformers. By this arrangement, the protective equipment of the entire circuit located at the central feeder location can be lower in current value, more sensitive and quicker in operation, thus affording a higher degree of protection for the entire circuit.

The sequence of operations of such a circuit following an outage or an unavoidable de-energized period would be as follows: (1) Zero time and main circuit breaker R at the central substation K is closed, energizing the transmission circuit L and the rural substation transformers M, five seconds allowed for charging current and transformer transient to dissipate; (2) five seconds after main circuit breaker closed at central substation K and line recloser A closes, energizing distribution circuit N to the two other reclosers A associated therewith; (3) ten seconds later (or fifteen seconds after main circuit breaker closed at central substation K) and line recloser A associated with line section O closes energizing line section O beyond its location; (4) ten seconds later (or twenty-five seconds after main circuit breaker closed at central substation K) and line recloser A associated with line section P closes, energizing line P beyond its location.

Various changes may be made to the form of the invention herein shown and described without departing from the spirit of the invention or scope of the claims.

I claim:

1. In a high-voltage inrush electric current control circuit recloser, a high-tension electric switch; a potential transformer in circuit therewith; a synchronous electric motor; a low-tension electric switch in circuit with said motor and transformer; a self-opening electric switch with one pole thereof electrically connected with said motor; solenoid-operated means for opening and closing said high-tension switch, the windings thereof being electrically connected with said motor and the other pole of said self-opening switch; and lockout means to render the recloser open under persistent short circuit conditions in sub-mains and feeders of the transmission circuit, including a normally-closed lockout switch in circuit with said motor and transformer, a reciprocating member provided with a plurality of spaced-apart integrating pins and a lockout switch-tripping means, and two actuator arms, one movable upon rotation of the rotor of said electric motor to close said self-opening switch, and the other movable upon rotation of said rotor to engage said pins, one after another, until said lockout switch-tripping means opens said lockout switch.

2. In a high-voltage inrush electric current control circuit recloser, a high-tension electric switch; a potential transformer in circuit therewith; a synchronous electric motor; a low-tension electric switch in circuit with said motor and transformer; a self-opening electric switch with one pole thereof electrically connected with said motor; solenoid-operated means for opening and closing said high-tension switch, the windings thereof being electrically connected with said motor and the other pole of said self-opening switch; and lockout means to render the recloser open under persistent short circuit conditions in sub-mains and feeders of the transmission circuit, including a normally-closed lockout switch in circuit with said motor and transformer, a reciprocating member provided with a plurality of spaced-apart integrating pins and a lockout switch tripping means, latching means to normally secure said reciprocating member in a fixed position, and three actuator arm means, all operable upon rotation of the rotor of said motor, one of said three means being operable to close said self-opening switch, another of said three means being operable to engage said pins, one after another, until said lockout switch-tripping means opens said lockout switch, and the third of said three means being operable to unlatch said latching means from said reciprocating member.

3. In a high-voltage inrush electric current control circuit recloser, a high-tension electric switch; a potential transformer in circuit therewith; a synchronous electric motor; a low-tension electric switch in circuit with said motor and transformer; a self-opening electric switch with one pole thereof electrically connected with said motor; solenoid-operated means for opening and closing said high-tension switch, the windings thereof being electrically connected with said motor and the other pole of said self-opening switch; and lockout means to render the recloser open under persistent short circuit conditions in sub-mains and feeders of the transmission circuit, including a normally-closed lockout switch in circuit with said motor and transformer, a reciprocating member provided with a plurality of spaced-apart integrating pins and a lockout switch tripping means, including a lockout pin carried by said reciprocating member for reciprocation in a direction normal to the path of reciprocation of said reciprocating member and constructed and arranged to cause tripping of said lockout switch when said reciprocating member carries said pin opposite said lockout switch, latching means to normally secure said reciprocating member in a fixed position, and three actuator arm means, all operable upon rotation of the rotor of said motor, one of said three means being operable to close said self-opening switch, another of said three means being operable to engage said integrating pins, one after another, until said lockout switch-tripping means opens said lockout switch, and the third of said three means being operable to unlatch said latching means from said reciprocating member.

4. In a high-voltage inrush electric current control circuit recloser, a high-tension electric switch; a potential transformer in circuit therewith; a synchronous electric motor; a low tension electric switch in circuit with said motor and transformer; a self-opening electric switch with one pole thereof electrically connected with said motor; solenoid-operated means for opening and closing said high-tension switch, the windings thereof being electrically connected with said motor and the other pole of said self-opening switch; and lockout means to render the recloser open under persistent short circuit conditions in sub-mains and feeders of the transmission circuit, including a normally-closed lockout switch in circuit with said motor and transformer, a reciprocating member provided with a plurality of spaced-apart integrating pins and a lockout switch tripping means, including a spring-urged lockout pin carried by said reciprocating member for reciprocation in a direction normal to the path of reciprocation of said reciprocating member and constructed and arranged to cause tripping of said lockout switch when said reciprocating member carries said pin opposite said lockout switch, latching means to normally secure said reciprocating member in a fixed position, and three actuator arm means, all operable upon rotation of the rotor of said motor, one of said three means being operable to close said self-opening switch, another of said three means being operable to engage said integrating pins, one after another, until said lockout switch-tripping means opens said lockout switch, and the third of said three means being operable to unlatch said latching means from said reciprocating member.

5. In a high-voltage inrush electric current control circuit recloser, a high-tension electric switch; a potential transformer in circuit therewith; a synchronous electric motor; a low-tension electric switch in circuit with said motor and transformer; a self-opening electric switch with one pole thereof electrically connected with said motor; solenoid-operated means for opening and closing said high-tension switch, the windings thereof being electrically connected with said motor and the other pole of said self-opening switch; and lockout means to render the recloser open under persistent short circuit conditions in sub-mains and feeders of the transmission circuit, including a normally-closed lockout switch in circuit with said motor and transformer, a reciprocating member provided with a plurality of spaced-apart integrating pins and a lockout switch tripping means, a fixed support for said lockout switch, said support having an opening, with a plunger slidably contained therein and normally extending from opposite faces thereof, said lockout switch having a movable contact member disposed in the path of travel of said plunger, a lockout pin carried by said reciprocating member for reciprocation in a direction normal to the path of reciprocation of said reciprocating member and constructed and arranged to contact and move said plunger when said reciprocating member carries said pin opposite said lockout switch and in axial alignment with said plunger, latching means to normally secure said reciprocating member in a fixed position, and three actuator arm means, all operable upon rotation of the rotor of said motor, one of said three means being operable to close said self-opening switch, another of said three means being operable to engage said integrating pins, one after another, until said lockout switch-tripping means opens said lockout switch, and the third of said three means being operable to unlatch said latching means from said reciprocating member.

6. In a high-voltage inrush electric current control circuit recloser, a high-tension electric switch; a potential transformer in circuit therewith; a synchronous electric motor; a low-tension electric switch in circuit with said motor and transformer; a self-opening electric switch with one pole thereof electrically connected with said motor; solenoid-operated means for opening and closing said high-tension switch, the windings thereof being electrically connected with said motor and the other pole of said self-opening switch; and lockout means to render the recloser open under persistent short circuit conditions in sub-mains and feeders of the transmission circuit, including a normally-closed lockout switch in circuit with said motor and transformer, a reciprocating member provided with a plurality of spaced-apart integrating pins and a lockout switch tripping means, a fixed support for said lockout switch, said support having an opening, with a plunger slidably contained therein and normally extending from opposite faces thereof, said lockout switch having a movable contact member disposed in the path of travel of said plunger, a lockout pin carried by said reciprocating member for reciprocation in a direction normal to the path of reciprocation of said reciprocating member and constructed and arranged to contact and move said plunger when said reciprocating member carries said pin opposite said lockout switch and in axial alignment with said plunger, a movable barrier carried by said fixed support, a resilient member urging said barrier longitudinally of said fixed support to a position covering the end of said opening opposite its end adjacent said lockout switch, said barrier having a face constructed and arranged to receive an end face of said pin when said pin is in one position and a face constructed and arranged to abut the side of said pin when said pin is in another position, latching means to normally secure said reciprocating member in a fixed position, and three actuator arm means, all operable upon rotation of the rotor of said motor, one of said three means being operable to close said self-opening switch, another of said three means being operable to engage said integrating pins, one after another, until said lockout switch-tripping means opens said lockout switch, and the third of said three means being operable to unlatch said latching means from said reciprocating member.

7. In a high-voltage inrush electric current control circuit recloser, a high-tension electric switch; a potential transformer in circuit therewith; a synchronous electric motor; a low-tension electric switch in circuit with said motor and transformer; a self-opening electric switch with one pole thereof electrically connected with said motor; solenoid-operated means for opening and closing said high-tension switch, the windings thereof being electrically connected with said motor and the other pole of said self-opening switch; lockout means to render the recloser open under persistent short circuit conditions in sub-mains and feeders of the transmission circuit, including a normally-closed lockout switch in circuit with said motor and transformer, a reciprocating member provided with a plurality of spaced-apart integrating pins and a lockout switch tripping means, a fixed support for said lockout switch, said support having an opening, with a plunger slidably contained therein and normally extending from opposite faces thereof, said lockout switch having a movable contact member disposed in the path of travel of said plunger, a lockout pin carried by said reciprocating member for reciprocation in a direction normal to the path of reciprocation of said reciprocating member and constructed and arranged to contact and move said plunger when said reciprocating member carries said pin opposite said lockout switch and in axial alignment with said plunger, a movable barrier carried by said fixed support, a resilient member urging said barrier longitudinally of said fixed support to a position covering the end of said opening opposite its end adjacent said lockout switch, said barrier having a face constructed and arranged to receive an end face of said pin when said pin is in one position and a face constructed and arranged to abut the side of said pin when said pin is in another position, latching means to normally secure said reciprocating member in a fixed position, and three actuator arm means, all operable upon rotation of the rotor of said motor, one of said three means being operable to close said self-opening switch, another of said three means being operable to engage said integrating pins, one after another, until said lockout switch-tripping means opens said lockout switch, and the third of said three means being operable to unlatch said latching means from said reciprocating member; and manual means to reciprocate said pin independently of the movement of said pin when the pin contacts said plunger.

8. In a high-voltage inrush electric current control circuit recloser; means to place said recloser in circuit with a high voltage transmission circuit; a high-tension electric switch; means to open and close said switch including an armature, a latch structure carried partly thereby, including a bolt and a movable keeper, a high tension, short circuit member-tripping solenoid, a no-voltage member-tripping solenoid, a keeper-tripping member disposed in the path of travel of the armature of one of said solenoids, a keeper-tripping member disposed in the path of travel of the other of said solenoids, the windings of said first-named solenoid being in circuit with said high-tension switch; time-delay means to actuate said second means to reclose said switch after a predetermined time interval subsequent to the opening of said switch; means to establish potential to the recloser after an outage, including a potential transformer; lockout means to render the recloser open and inoperative under persistent short-circuit condition in the sub-mains and laterals of the transmission circuit including an electric lockout switch, the windings of said second-named solenoid being in circuit with one of the windings of said potential transformer and in circuit with said lockout switch.

9. In a high-voltage inrush electric current control circuit recloser; means to place said recloser in circuit with a high voltage transmission circuit; a high-tension electric switch; means to open and close said switch including a first solenoid, a latch structure carried partly by the armature of said solenoid, including a bolt and a pivoted keeper, a second solenoid, a third solenoid, a keeper-tripping member disposed in the path of travel of the armature of said second solenoid, a keeper-tripping member disposed in the path of travel of the armature of said third solenoid, the windings of said second solenoid being in circuit with said high-tension switch; time delay means to actuate said second means to reclose said switch after a predetermined time interval subsequent to the opening of said switch including an electric motor; means to establish potential to the recloser after an outage, including a potential transformer; lockout means to render the recloser open and inoperative under persistent short-circuit conditions in the transmission circuit, sub-mains and feeders, including an electric lockout switch; a self-opening electric switch; the windings of said first solenoid being in circuit with said self-opening switch and the windings of said motor, the windings of the second solenoid being in circuit with said lockout switch and one of the windings of said potential transformer, and the windings of the third solenoid being in circuit with said high tension switch.

10. In a high voltage inrush electric current control circuit recloser; means to place said recloser in circuit with a high voltage transmission circuit; a high-tension electric switch; means to open and close said switch including a first solenoid, a latch structure carried partly by the armature of said solenoid, including a bolt and a pivoted keeper, a second solenoid, a third solenoid, a keeper-tripping member disposed in the path of travel of the armature of said second solenoid, a keeper-tripping member disposed in the path of travel of the armature of said third solenoid, the windings of said second solenoid being in circuit with said high-tension switch; time delay means to actuate said second means to reclose said switch after a predetermined time interval subsequent to the opening of said switch including an electric motor; means to establish potential to the recloser after an outage, including a potential transformer; lockout means to render the recloser open and inoperative under persistent short-circuit conditions in the transmission circuit sub-mains and feeders, including an electric lockout switch; a self-opening electric switch; a normally-closed low-tension electric switch, means carried by the armature of said first solenoid to open said low-tension switch, the windings of said first solenoid being in circuit with said self-opening switch and the windings of said motor, the windings of the second solenoid being in circuit with said lockout switch and one of the windings of said potential transformer, the windings of the third solenoid being in circuit with said high tension switch, and the low-tension switch being in circuit with the windings of said motor, said first solenoid and one of the windings of said potential transformer.

11. In a high voltage inrush electric current control circuit recloser; means to place said recloser in circuit with a high voltage transmission circuit; a high-tension electric switch; means to open and close said switch including a first solenoid, a latch structure carried partly by the armature of said solenoid, including a bolt and a pivoted keeper, a second solenoid, a third solenoid, a keeper-tripping member disposed in the path of travel of the armature of said second solenoid, a keeper-tripping member disposed in the path of travel of the armature of said third solenoid, the windings of said second solenoid being in circuit with said high-tension switch; time delay means to actuate said second means to reclose said switch after a predetermined time interval subsequent to the opening of said switch including an electric motor; means to establish potential to the recloser after an outage, including a potential transformer; lockout means to render the recloser open and inoperative under persistent short-circuit conditions in the transmission circuit sub-mains and feeders, including an electric lockout switch; a self-opening electric switch; a normally-closed low-tension electric switch, means carried by the armature of said first solenoid to open said low tension switch, including an arm carried by said armature of said first solenoid, with the movable contact of said low-tension switch interposed in the path of travel of said arm, the windings of said first solenoid being in circuit with said self-opening switch and the windings of said motor, the windings of the second solenoid being in circuit with said lockout switch and one of the windings of said potential transformer, the windings of the third solenoid being in circuit with said high tension switch, and the low-tension switch being in circuit with the windings of said motor, said first solenoid and one of the windings of said potential transformer.

12. In a high-voltage inrush electric current control recloser, means to place said recloser in circuit in a high-voltage transmission circuit; a high tension electric switch; electric means to trip said switch; electro-mechanical means to cause said electric means to successively trip said switch for a plurality of successive fault trippings and to follow with a lockout under persistent fault condition in said circuit exteriorly of said recloser; electro-mechanical switch reclosing means operatively connected with said switch; electro-mechanical means responsive to reestablished potential, following correction of said fault condition, to cause said switch reclosing means to reclose said switch; manually-operated means to cause said switch reclosing means to close said switch; and manually set means to selectively vary the reclosing time interval of said switch reclosing means, and to selectively cause said switch reclosing means to retain said switch closed, when closed through operation of said manually-operated means, and selectively cause said electric means to trip said switch when fault conditions still exist in said circuit exteriorly of said recloser after one reclosure of said switch.

ERNEST O. PAINTER.

REFERENCES CITED

The following references are of record in the file of this patent:

UNITED STATES PATENTS

| Number | Name | Date |
|---|---|---|
| Re. 16,661 | Kautz | June 21, 1927 |
| 1,272,444 | Holliday | July 16, 1918 |
| 1,272,447 | Jacobs | July 16, 1918 |
| 1,743,795 | Nankivell | Jan. 14, 1930 |
| 1,835,342 | Schnell et al. | Dec. 8, 1931 |
| 1,983,817 | Scott | Dec. 11, 1934 |
| 2,068,620 | Spurgeon | Jan. 19, 1937 |
| 2,384,362 | Anderson | Sept. 4, 1945 |
| 2,475,765 | Wallace | July 12, 1949 |